United States Patent
Mason et al.

(10) Patent No.: US 11,038,708 B2
(45) Date of Patent: Jun. 15, 2021

(54) CONTROL EVENTS IN A SYSTEM OF NETWORKED HOME DEVICES

(71) Applicant: SIGNIFY HOLDING B.V., Eindhoven (NL)

(72) Inventors: Jonathan David Mason, Waalre (NL); Dzmitry Viktorovich Aliakseyeu, Eindhoven (NL); Huon Urbald Ogier Norbert Van De Laarschot, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/490,646

(22) PCT Filed: Feb. 26, 2018

(86) PCT No.: PCT/EP2018/054625
§ 371 (c)(1),
(2) Date: Sep. 3, 2019

(87) PCT Pub. No.: WO2018/158172
PCT Pub. Date: Sep. 7, 2018

(65) Prior Publication Data
US 2020/0007356 A1    Jan. 2, 2020

(30) Foreign Application Priority Data
Mar. 2, 2017 (EP) .................................. 17158898

(51) Int. Cl.
*H04L 12/28* (2006.01)
*H04W 4/70* (2018.01)
(Continued)

(52) U.S. Cl.
CPC ............ *H04L 12/2827* (2013.01); *H04W 4/70* (2018.02); *H05B 47/11* (2020.01); *H05B 47/155* (2020.01);
(Continued)

(58) Field of Classification Search
CPC ...... H04L 12/2827; H04W 4/70; H05B 47/11; H05B 47/16; H05B 47/155; G05B 2219/2642; Y02B 20/40
See application file for complete search history.

(56) References Cited

U.S. PATENT DOCUMENTS 9,386,669 B2    7/2016    Karc et al.
2013/0085615 A1    4/2013    Barker
(Continued)

FOREIGN PATENT DOCUMENTS

WO    2014204286 A1    12/2014
WO    2015150927 A1    10/2015
WO    2016009016 A1    1/2016

*Primary Examiner* — Charles R Kasenge

(57) ABSTRACT

A controller handles control events in a system of networked home devices by: receiving a signal indicative of a control event, which is an actuation of a user input device; and in response, determining whether to perform a control function associated with a networked home device, that determination being made in dependence on a state of interaction between that device and a physical environment in which it is located at a time of the control event. If the control function is performed in response to the control event, it causes the networked home device to perform an action that changes the state of interaction between that device and the physical environment in which it is located. Otherwise, the controller causes another control function associated with a different networked home device of the system to be performed in response to the control event instead.

13 Claims, 3 Drawing Sheets

(51) Int. Cl.
    *H05B 47/11*    (2020.01)
    *H05B 47/16*    (2020.01)
    *H05B 47/155*   (2020.01)

(52) U.S. Cl.
    CPC ..... *H05B 47/16* (2020.01); *G05B 2219/2642* (2013.01)

(56) References Cited

U.S. PATENT DOCUMENTS

| | | |
|---|---|---|
| 2013/0294050 A1 | 11/2013 | Lee et al. |
| 2015/0189724 A1* | 7/2015 | Karc ................ H05B 47/11 315/149 |
| 2015/0338833 A1 | 11/2015 | Allan et al. |
| 2016/0073482 A1 | 3/2016 | Fok et al. |
| 2016/0192461 A1 | 6/2016 | Minsky |
| 2016/0278188 A1* | 9/2016 | Karc ................ E06B 9/24 |

* cited by examiner

CONTROL EVENTS IN A SYSTEM OF NETWORKED HOME DEVICES

CROSS-REFERENCE TO PRIOR APPLICATIONS

This application is the U.S. National Phase application under 35 U.S.C. § 371 of International Application No. PCT/EP2018/054625, filed on Feb. 26, 2018, which claims the benefit of European Patent Application No. 17158898.1, filed on Mar. 2, 2017. These applications are hereby incorporated by reference herein.

TECHNICAL FIELD

The present invention relates to the handling of control events in a system of networked home devices. That is, a so-called "smart home" system.

BACKGROUND

Connected lighting refers to a class of lighting system in which the lights (luminaires) can be controlled based on the communication of data between the lights and a controlling device (such as a smartphone, tablet, smart-switch etc.) using network technology, according a network communications protocol or combination of such protocols, such as ZigBee, Bluetooth, Wi-Fi, Ethernet, Z-Wave, Thread etc. This allows a connected lighting system to provide richer functionality than traditional lighting systems, for example allowing a user to directly control the lights using an application (app) executed on a smartphone, wearable device or other user device, and to easily incorporate new control points, such as light switches or sensors, into the lighting system without rewiring it.

In a home context, connected lighting falls under the wider umbrella of so-called "smart home" technology, where the aim is to provide a far greater range of control functions for smart devices in a home than traditional systems, using modern network technologies as a basis for the control functions. As well as a general-purpose user device, it may also possible to incorporate other forms of user input device into a smart home, such as a voice command unit.

For connected lighting systems in particular, smart light switches may be provided. A smart switch is a user input device with an intentionally limited user interface, such as a set of push button switches (or other user input components), to provide quick and simple lighting control. In some respects, a smart switch is comparable to a legacy light switch, but in contrast to a legacy switch the control is based on network technology and the options provided are consequently more flexible, allowing different control functions to be mapped to the user input components as desired. Many of smart switches available today are also portable, in contrast to hard-wired legacy switches.

Whilst connected lighting has become more widely adopted in recent times, and has been one of the main routes to smart home technology for many people, it is not the only one to have seen increasingly mainstream adoption.

For example, another popular route into the smart home is through home security systems. Affordable home video camera systems which can constantly monitor a home and allow a user to view the resulting content at any time, even remotely (via the Internet) in a secure manner, are becoming more prevalent.

Connected audio systems, which can be integrated into a smart home system, are also growing in popularity. Connected audio devices are generally relatively high-quality audio playout devices (compared with, say, integrated loudspeakers in consumer devices) which can be flexibly controlled, for example to provide synchronized audio playout across multiple connected audio devices distributed throughout a home.

The success of smart home and "internet of things" products will depend on how well they can seamlessly and effortlessly fit in with users' lifestyles and ways of living. The more cumbersome these technologies are to install or use then the greater the chance they will be neglected. These technologies need to appeal to not only to user's heads (e.g. through factors like security, convenience etc.) but also to their hearts if their considerable potential is ever to be fully exploited in the long-term.

Document D1 (US 2013/085615 A1) discloses a method which includes detecting an environmental condition within the patient room, and in response, generating a data packet including environmental control information, which is communicated to a field panel. The field panel is in communication with a first and second building automation system. The method adjusts a first and second environmental control parameter related to the first and the second building automation system respectively based on the environmental control information contained within the received payload such that the second environmental control parameter is different than the first environmental control parameter.

SUMMARY

In accordance with current terminology, herein a "smart home system" means a system of networked home devices. That is, consumer devices having network capabilities so that they can communicate with each other via a network, using network technology such as ZigBee, TCP/IP, Thread, Z-wave, Bluetooth etc. or any combination thereof ("smart home device").

The present invention provides users of smart home systems with a more convenient means of controlling those systems, wherein a user input device can be used to control different smart home devices in a convenient and intuitive manner.

A first aspect of the present invention is directed to a method of handling control events in a system of networked home devices, the method comprising, at a controller: receiving a signal indicative of a control event, the control event being an actuation of a user input device; and in response to the control event, determining whether to perform a control function (first or "primary" control function) associated with a networked home device of the system ("first home device"), that determination being made in dependence on a state of interaction between the networked home device and a physical environment in which it is located at a time of the control event; wherein if the control function is performed in response to the control event, it causes the networked home device to perform an action that changes the state of interaction between the networked home device and the physical environment in which it is located, wherein if the control function is not performed in response to the control event, the controller causes another control function (second or "secondary" control function) associated with a different networked home device ("second home device") of the system to be performed in response to the control event instead.

The smart home devices perform actions in order to carry out tasks within the home, and in this manner interact with a physical environment of the home in which they are located. Such interactions can be, for example, the emission of light, sound or heat into the environment (e.g. to provide illumination, video-output, audio playout, heating etc.) or the capturing of information from it (e.g. to capture image, audio or other sensor data, for example in a home security system) for the benefit of any person or people in the environment. References to "a state of interaction between a home device and a physical environment in which it is located" (or similar) are intended to be read in this context. The current state of interaction can for example depend on whether or not the device is currently emitting light/heat/sound into the environment (in a manner that is perceptible to the person/people therein), and in some cases the extent to which it is doing so (e.g. a current brightness/temperature/volume), or whether it is currently capturing information from the environment.

Making the determination of whether or not to perform the primary control function based on the actual current state of interaction between the first home device (i.e. the "primary" device linked to the user input device) frees the user from the burden of specifying whether he intends to perform the primary control function or the secondary control function. Rather, his intentions are inferred from the actual state of the primary device when the control event occurs.

In embodiments, at least one of the networked home device and the different networked home device may be a luminaire (i.e. one or both may be luminaires). For example, the networked home device may be a luminaire and the control function may be a lighting control function, the state of interaction between the luminaire and the physical environment being an illumination state associated with the luminaire. In this case, the lighting control function may only be performed if it would actually have an effect on the illumination state, or which would only have an effect below a threshold (that is, which would have an effect but one that is too small to meet a threshold criterion); otherwise the non-lighting function is performed. The threshold can for example relate to a change in brightness (e.g. change of more than, say, 10% or more than 5 lux is required for the lighting control function to be performed), a change in color (e.g. distance of more than X in a xy color space is required), a change in chromaticity, etc.

More generally, the controller may make said determination in dependence on the state of interaction by determining whether performance of the control function would cause a significant change in the state of interaction, and if not causes the different control function to be performed instead. In this context "significant" can mean any change in the state of interaction or only a change that meets a threshold criterion, i.e. the controller may make said determination in dependence on the state of interaction by determining whether performance of the control function would cause a change in the state of interaction; or alternatively whether it would cause a change that meets a threshold criterion.

In this context, lighting control is the primary function of the user input device, but it can for example be used to perform non-lighting control function in certain circumstances.

It also noted, however, that the benefits of the invention are not limited to a lighting context, and in some embodiments neither of the devices is a luminaire.

The home device may be part of a first (sub)system and the different home device may be part of a second, different (sub)system. The two subsystems may have independent user interfaces, via which the respective home device in those two subsystem systems can be accessed and/or configured independently. For example, one may be a lighting sub system and the other a heating subsystem. Such subsystems are referred to below as operational systems, which collectively from a system of networked home devices comprising the subsystems.

As another example, the first control event may be associated with the first control function for the first home device which causes that first home device to provide a first output when performed, and further associated with the second function in the second home device which causes that second home device to provide a second output. When the control event is received, the determination that is made may be whether or not the first home device is currently providing the first output; based on this determination the control event is sent to the first home device (when the first home device is currently not providing the first output) or to the second home device (when the first home device is currently providing the first output). That is, the first control function is performed if the first home device is not providing the first output at the time of the control event, and the second control function is performed otherwise to cause the second home device to provide the second output.

Other Example Use Cases are Described Below.

The controller may make said determination in further dependence on a time interval between the control event and an earlier control event that caused the networked home device to change the state of interaction. For example, the controller may make said determination in dependence on the time interval by determining whether the time interval meets a threshold criterion.

In any of the above cases, the controller may make said determination in dependence on the state of interaction by determining whether the state of interaction meets a threshold criterion. For example, for an illumination state associated with a luminaire, whether or not a brightness of the illumination state currently exceeds a threshold (which may or may not take ambient light into account in addition to the emitted light from the luminaire). Note this is looking at an absolute property of the state (e.g. whether the illumination state is 'bright enough' already, irrespective of whether or not performance of the control function would make it brighter still), which is different from determining whether the control function would cause a change in the state that meets a threshold criterion (e.g. determining whether the brightness change would be above a threshold).

For the avoidance of doubt, it is noted that the term "illumination state" can (but need not necessarily include) a contribution from ambient light. Herein, the term "lighting state" is used to refer to artificial light emitted by a lighting system excluding any ambient light. Depending on the context, the illumination state can simply be the lighting state, or it can be the lighting state plus any contribution from ambient light (e.g. natural light).

The control function and the different control function may be associated with a user input component of the user input device. The earlier control event may be an earlier actuation of the user input component, and the controller may respond to the earlier control event by performing the associated control function to change the state of interaction, wherein the control event is a later control event caused by actuation of the same user input component.

The controller may respond to the later control event by performing the different control function associated with the user input component if the time interval between those events meets the threshold criterion and performance of the first control action would not cause any significant change in the state of interaction.

If the controller (first controller) determines not to perform the control function in response to the control event, it may: determines whether performance of a third control function for a third networked home device of the system would cause any significant change in a state of interaction between the third networked home device and a physical environment in which it is located, or provide an indication of the control event to a different controller (second controller) for making that determination at the different controller (i.e. "pass on" the control event to the different controller); and if performance of the third control function would not have any significant effect, the other control function is performed for the different networked home device.

In the case that the first controller passes on the control event, if the second controller determines that performance of the third control function would not have any significant effect; the different controller may:

provide an indication of that determination back to the first controller, in response to which the controller causes the other control function to be performed (i.e. pass the control event back to the first controller), perform the other control function (itself), or provide an indication of that determination to a third controller, in response to which the third controller causes the other control function to be performed (i.e. pass the control event onwards to a third controller).

For the latter, the third controller can then proceed in the same way as the second controller.

For Example:

A first controller is part of an audio system: a button on the user input apparatus associated with a play action (play button) is pressed but music is already playing; thus command is passed on to the second controller in a lighting system, The lighting system controller checks whether a light setting associated with the play button (which may in turn be dependent on current audio output) is activated; assuming it is, the command is passed on to a third controller in a third system (either directly from the second to the third autonomous system, or the second autonomous system passed back the command to the first autonomous system which then controls the third system)

The third autonomous system is a fireplace which has an ON function associated with the play button being pressed and the third controller checks whether the fire is on; assuming it is not, it therefore executes the ON function.

Third control function may be a non-lighting control function, the third networked home device being a device other than a luminaire and of a type different than the different networked home device.

The user input component may be one of a plurality of user input components of the user input device, each of which is associated with a respective control function. For example, the or each user input component of the user input device may be a push button switch.

Preferably the user input device is a light switch (i.e. smart switch, of the kind described above). A light switch may be easier to find when a user wishes to quickly activate or deactivate certain non-lighting smart home features, such as capturing a video with a connected smart home camera system or pausing playout from a connected audio system, or some other non-lighting function. Moreover, the interaction with a light switch is essentially instantaneous, e.g. a user picks up the switch and presses a button on it. In contrast many mobile devices may require a pass code and an app or widget to be activated, increasing the number of interaction steps required.

As physical controls (such as a smart switch) provide convenience in controlling smart devices, there will be a desire to limit the number of smart switches that are used, to avoid having to add a smart switch for each device or action (i.e. control function). Beneficially, the present invention reduces the requirement for additional physical controllers.

Some existing types of smart switches allow different control functions to be associated with different input styles; e.g. by differentiating between one push, double push and long push, which can increase the level of control provided by one switch. However, using the present techniques, this can be extended further, such that a lighting control function associated with, say, a long push of a particular button is only performed if it would actually have an effect, and a non-lighting function associated with a long push of that button is performed otherwise.

In some embodiments, the different networked home device may be a device other than a luminaire, the different lighting control function being a non-lighting control function. For example, it may be:

an image capture device,
an audio playout device,
a media device,
a device of a security system,
a phone device,
a thermostat,
a cleaning device,
a drive mechanism for driving automated doors, windows, blinds and/or curtains, or
a heating, ventilation and/or air conditioning device.

The lighting controller may derive one or more control parameters for the different control function from one or more parameters of the control function. For example, where the former is a lighting control function and the latter is a non-lighting control function, the lighting controller may derive one or more control parameters for the non-lighting control function from one or more lighting parameters of the lighting control function.

A second aspect of the present invention is directed to a controller for a system of networked home devices, the controller comprising: an input configured to receive a signal indicative of a control event, the control event being an actuation of a user input device; and control logic configured to implement any of the method steps disclosed herein.

A third aspect of the present invention computer program produce comprising code stored on a computer readable storage medium and configured when executed on a controller to implement any of the method steps disclosed herein.

Another aspect of the present invention is directed to a method of handling control events in a lighting system, the method comprising, at a lighting controller: receiving a signal indicative of a control event, the control event being an actuation a user input device; and determining whether to respond to the control event by performing a lighting control function or a non-lighting control function; wherein the lighting control function, when performed, causes at least one luminaire of the lighting system to change an illumination state associated with the lighting system, wherein the non-lighting control function, when performed, causes an operational change at a second operational system other than a lighting system; wherein said determination is made in dependence on: the illumination state at a time of the control event, and/or a time interval between the control event and an earlier control event that caused at least one luminaire of the lighting system to change the illumination state.

It is also noted, for the avoidance of doubt, that whilst the controller can be a separate device, it can also be a component of one of the networked home devices themselves.

BRIEF DESCRIPTION OF FIGURES

For a better understanding of the present invention, and to show how embodiments of the same may be carried into effect, reference is made to the following figures in which.

DETAILED DESCRIPTION OF EXAMPLE EMBODIMENTS

By way of example, embodiments of the present invention are described in the context of a smart home system comprising a connected lighting system (1 in FIGS. 1-3), and at least one other operational system (52, 53 in FIG. 3), which can be seen as subsystems of the smart home system. However, connected lighting is just one example, and all description below pertaining to lighting control functions or illumination states applies equally to other types of control function and other states of interaction (e.g. an audio or image/video output state, a heating state, an information capturing state for a sensor etc.).

The subsystem of the smart home system have certain functions within the home and can have varying degree of operational dependence (e.g. they might be controlled by the same controller, such as a central "smart home hub", or they might have different controllers, such as a lighting system "bridge" and a separate hub). However, there is always a degree of interdependence in so far as control events at a user input device can cause actions in either of the systems depending on the circumstances in which they occur.

Figure 1:
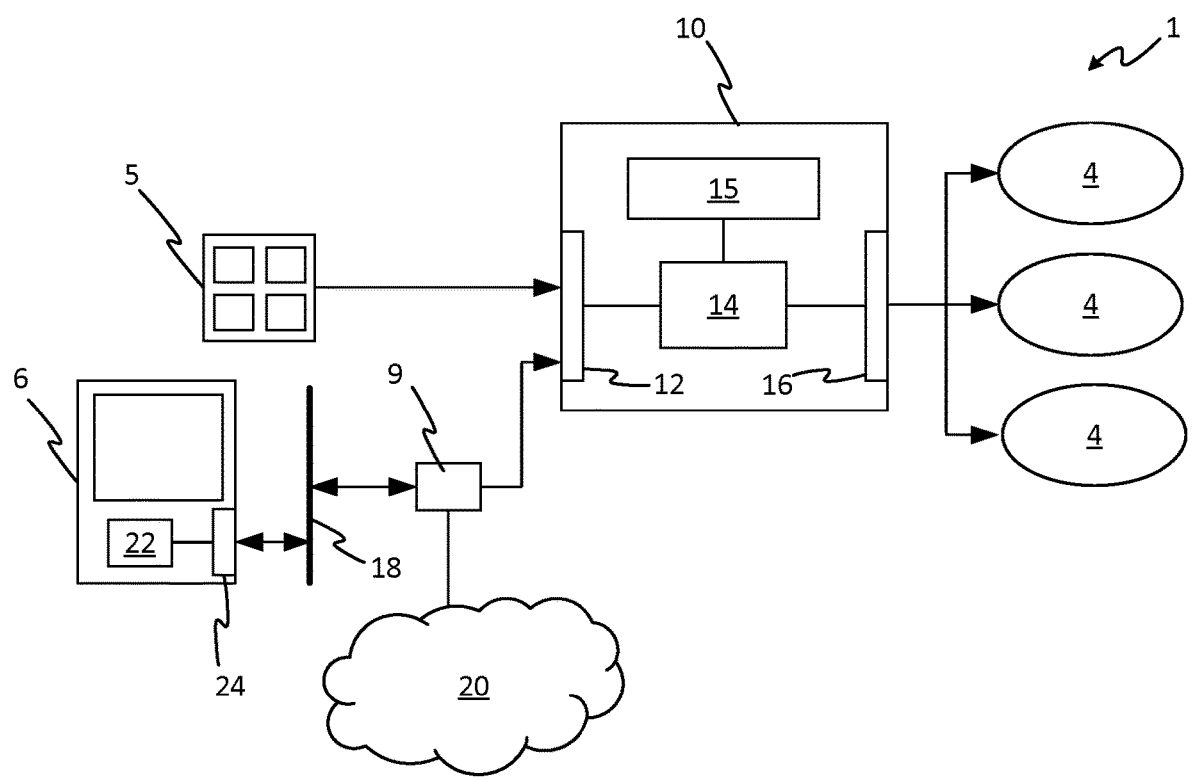
FIG. 1 shows a schematic block diagram of a connected lighting system.
Figure 2:
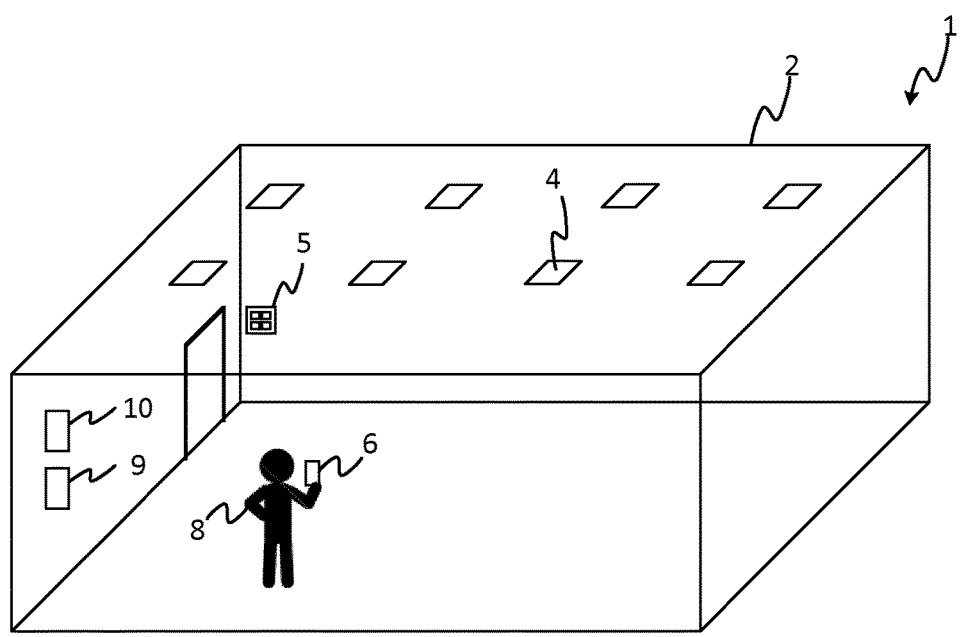
FIG. 2 shows a perspective view of the lighting system arranged in an environment.

FIG. 1 shows a schematic block diagram of the connected lighting system 1, and FIG. 2 shows an example of how the lighting system 1 may be arranged in an environment 2 so as to illuminate the environment 2. The environment 2 can comprise an indoor space within a building, such as one or more rooms and/or corridors (or part thereof) and/or may an outdoor space such as a garden or park, or a partially-covered space such as a stadium or gazebo (or part thereof), or a combination of such spaces. In the described examples, the environment 2 is the user's home, or part of his home spanning several rooms of the home, and possibly extending into an outdoor space such as a garden or balcony. The lighting system 1 comprises one or more luminaires (lights) 4, which can for example be ceiling-mounted (as shown), so as to be able to illuminate a surface below them (e.g. the ground or floor, or a work surface), mounted on the wall, embedded in the floor or items of furniture etc. or any combination thereof. Each of the luminaires 4 comprises at least one illumination source, i.e. a light emitting device such as an LED-lamp, gas-discharge lamp or filament bulb, plus any associated housing or support. Each of the luminaires 4 may take any suitable form such as a ceiling or wall mounted luminaire, a free standing luminaire (e.g. table lamp, desk lamp or floor lamp etc.), a wall washer, or a less conventional form such as an LED strip, a luminaire built into a surface or an item of furniture, or any other type of illumination device for emitting illumination into the environment 2 so as to illuminate the environment 2. For example, functional illumination (that is, to emit light of sufficient intensity and over a sufficiently large area that the user 8 in the environment 2 can see his surroundings as a consequence of the illumination), or which can at least provide aesthetic illumination to create a desired ambience in the environment 2.

In addition to the luminaires 4, the lighting system 1 is shown to comprise a central control device in the form of a gateway 10, sometimes referred to as a lighting bridge. The bridge 10 is shown to comprise a first communication interface 12, a second communication interface 16 and a processor 14 connected to the first and second interfaces 12, 16. The bridge 10 is also shown to comprise memory 15 connected to the processor 14. Each of the luminaires 4 is shown connected to the bridge 10 via the second interface 16. For example the luminaires 4 may form a wireless mesh network where at least some of the luminaires 4 act as relays to relay data between the bridge 10 and other luminaires 4 (that is, at least some of the luminaires 4 connect to the bridge 10 indirectly, via one or more other luminaires 4). This wireless mesh network configuration can extend the range of the network beyond the direct communication range of the second interface 16. For example, the second interface 16 may be a ZigBee interface, where the luminaires 4 and the bridge 10 form a ZigBee network. In order to control the luminaires 4 via the bridge 10, at least one user input device can connect to the first interface 12 of the bridge 10, for example via a wireless connection such as Wi-Fi or Bluetooth or a wired connection e.g. based on Ethernet. These examples are not exhaustive, and other network protocols such as Thread, Z-Wave etc. can also be used. The user input device can for example a general-purpose user device 6 executing a lighting control application (app), such as a smartphone, tablet, wearable device, home automation hub (e.g. based on voice control) or any other general-purpose computing device, or a light switch 5 equipped with network communication technology (smart switch). In this example a user device 6 is shown connected to the bridge 10 via a local area network 18 provided by a network router 9, such as a Wi-Fi router. In some cases it may also be possible to connect to the bridge 10 from an external network 20 such as the Internet (e.g. e.g. via the router 9) to allow the user 8 to control the luminaires 4 remotely. The user device 6 is shown to comprise a processor 22 on which the lighting control app (not shown) is executed and a network interface 24 via which the processor 22 of the user device 6 can connect to the local area network 18, for example via a Wi-Fi connection. Alternatively the user device 6 can connect to the bridge 10 directly, for example via a Bluetooth connection. It is also possible to implement a connected lighting system without the bridge 10, in which case the various user input devices 5, 6 can control the luminaires 4 by communicating with them directly, for example using Bluetooth (such that neither a bridge 10 nor a router 9 required); alternatively, the luminaires 4 may connect directly to, say, the local network 18, so they can be controlled via the router 9 (such that no bridge 10 required). The bridge 10 may be a dedicated control device, or it could be part of one of the luminaires 4.

By way of example FIG. 2 shows a smart switch 5 disposed in the environment 2 along with the gateway 10 and router 9 with the user device 6 held by the user 8. However as will be appreciated this is merely an example for the purposes of illustration and various other arrangements and configurations are equally viable. For example, rather than being attached to the wall or other surface as shown, the smart switch 5 could be portable switch that the user 8 can carry with him.

Figure 3:
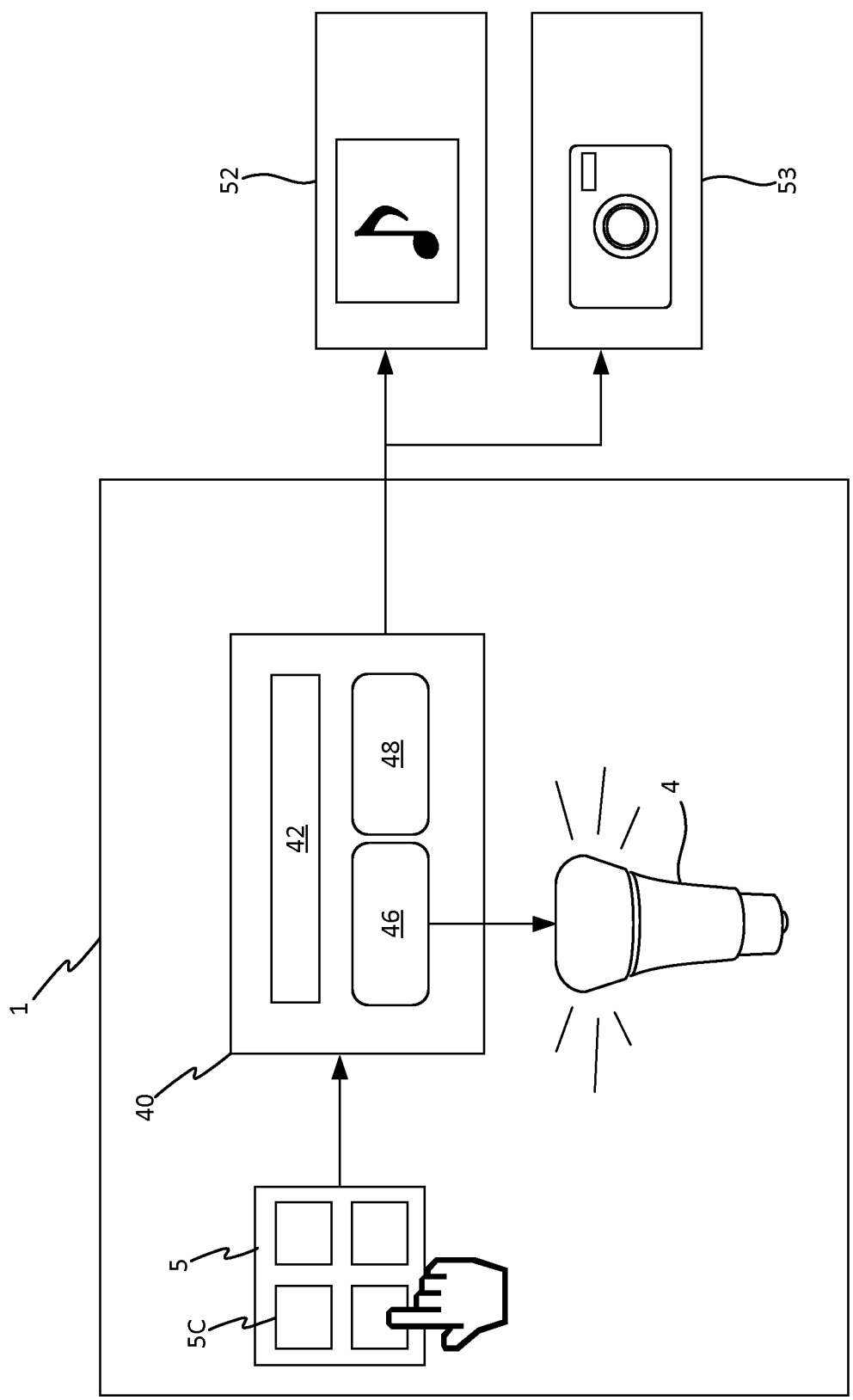
FIG. 3 shows a functional block diagram for a lighting controller.

FIG. 3 shows a functional block diagram for a lighting controller 40 of the lighting system 1, representing functionality implemented by the lighting controller 40. The lighting controller is shown to comprise a lighting control component 46 and a non-lighting control component 48. The lighting control component 46 represents lighting control functionality of the lighting controller 40, for controlling the luminaires 4 of the lighting system 1. The lighting controller 40 is connected to the luminaires 4 so that the luminaires 4 receive control inputs (commands) from the lighting control component 46 of the lighting controller 40. The lighting control component 46 performs all of the lighting control functions described herein.

By contrast, the non-lighting control component 48 represents non-lighting control functionality of the lighting controller 40, for controlling at least one operational system other than a lighting system (i.e. a non-lighting system, which does not include any form of luminaire), such as a non-lighting smart home subsystem. That is, some other smart home or connected system installed in the environment 2, such as a video camera system, a connected audio system, window blinds, a HVAC (heating, ventilation and air conditioning) system, a TV (or other media device), etc. Such a system can be used for a single function, yet also systems exist that combine functions or operate as a hub amongst smart home systems. For example, connected video cameras are currently available, that can be connected to the Internet and also to other smart home devices and systems such as lighting, audio, blinds, etc. via a thermostat system. The non-lighting control component 48 performs all of the non-lighting control functions described herein.

The lighting controller 40 can be part of one of the lamps 4 (for example, where the bridge 10 is implemented at that luminaire, rather than as a separate device), although preferably it is an external source, such as a control device in the lighting network (e.g. Hue bridge) or via an online service (e.g. Portal), etc.

In the system of FIG. 1, the lighting controller 40 is preferably implemented at the bridge 10, as in the examples described below. However, it could also implemented, for example, at the user device 6 or the switch 5 itself, or or at a back-end system that connects to the luminaires via the Internet 20, such as a cloud system (e.g. Portal). In general, the lighting controller 40 can be implemented by any suitable device or combination of devices in the lighting system 1, locally and/or remotely.

Preferably the functionality of the lighting controller 40 is implemented in software. That is, by computer-readable instructions executed on a processor (such as a CPU or CPUs) or processors of the device or devices at which it is implemented, such as the processor 14 of the bridge 10. However, the possibility of implementing at least part of this functionality in dedicated hardware, such as an application-specific integrated circuit or FPGA, is not excluded.

The smart switch 5 is shown in FIG. 3 to comprise a plurality of user input components 5C from which the lighting controller 40 can receive inputs. For example, the lighting controller 40 may connect to the smart switch 5 via one of the interfaces 12, 16 of the bridge 10 when implemented at the bridge 10, or via the interface 24 when implemented at the user device 6. As another example, the lighting controller 40 may receive inputs directly from the user input components 5C when implemented at the switch 5 itself. In any event, the lighting controller 40 connects to the lighting switch 5 so that it can detect control events, each of which is caused by actuation of one of the user input components 5C. That is, the controller 40 has an interface to the switch 5.

In the follow examples, the user input components 5C are buttons (push button switches), which the user 8 presses to actuate. In this context, the resulting control event that is detectable to the lighting controller 40 is called a light switch push event.

Note although the switch 5 is shown to comprise multiple user input components 5C, it is possible to implement certain embodiments of the present invention with a smart switch having only one user input component, such as a smart button. In particular, embodiments that include time dependency (see below) can be implemented with a single button switch.

In the main use-case scenarios described below, the lighting controller 40 determines which of the systems (lighting or non-lighting) said input is destined for based on a current lighting state for the lighting system 1. The current lighting state is tracked by updating lighting state data 42 in the memory 15 as control events occur, such that earlier control events, together with the lighting state data 42, determine whether later control events trigger control functions for the lighting system 1 or a separate non-lighting system.

The lighting state data 42 can for example record current brightness and colour values for each light individually, though including this level of detail is not essential. For example, the lighting state data may indicate a lighting scene that is currently selected for the lights in question. The scene can be a dynamic scene, defining time-varying brightness and/or colour values. Scenes can for example be identified by scene identifiers, such as scene names, each of which is associated with a respective set of lighting parameters for rendering that scene.

In that case, the lighting controller 40 may be setup as follows: during an initial setup the user 8 first assigns a light scene (static or dynamic) to a user input component 5C of the light switch 5; rendering this scene will be that component's primary lighting control function. The user 8 can also assign a secondary non-lighting function to that same component 5C. The lighting controller 40 may operate, in a default operation mode, such that the secondary functions activated only if the light is already in the state as prescribed by the primary function. This is, in the default operational mode, a first push of the button occurring when a different scene is selected causes a scene switch to the scene associated with the button. If the button is pressed again whilst that scene is selected, the light switch push event is passed to the second system. However, it may be possible for the user to change this default behaviour in some cases—see below.

To aid illustration, consider the following example. The user 8 user presses one of the buttons 5C on the switch 5, which creates a light switch push event that is passed on to the lighting controller 40. The controller 40 checks whether an action in the lighting system associated with that button, such as switching off one or more of the lights 4 to which that button is mapped, will change the current lighting state (typically light output) of the lighting system 1. Assuming those lights are off at that point, the button press causes the associated action to be executed: in this case the luminaires are switched off.

Now, should the user press the same button 5C on the smart light switch 5 again, the lighting controller 40 performs the same check, only this time the controller 40 determines that execution of the associated action would not change the state of the lighting system 1 because the lights in question are already on. Therefore, the lighting controller 40 passes on the received light switch push event from the lighting system to a separate non-lighting system, for example a smart music system (52, FIG. 3). The smart music system 52 has, associated with the light switch push event, an action to play music from a currently loaded playlist and thus music starts playing. With multiple buttons 5C, the user 8 can choose to associate each with a respective lighting scene (static or dynamic, and non-lighting control function as he sees fit.

Another example is the use of this functionality with a connected camera that has a "capture moment" feature that when activated records a short video.

In this case a secondary function for the light switch 5 will be to activate a video recording function at the video camera (or create a searchable bookmark in the recording if it's already active). When the user 8 wishes to inform the video camera system to record, optionally for a standard duration (e.g. around 2 minutes) the user presses one of the buttons on the light switch. This sends a signal to the controller 40 which can then interpret it, and if the light scene associated with that button is already activated (i.e. primary function is satisfied) it will then inform the video camera system, e.g. via a home network, to start recording. Alternatively, if the scene is not activated the user can perform two consecutive presses: the first activating the scene, and the second activating the recording.

In some embodiments, the user 8 can change from the default operating mode to a customized operating mode. For example, the user 8 might provide some additional conditions for the activation of the secondary function, such as if a light sensor detects that it is already sufficiently bright in the room and/or a timing constraint. This is described in further detail below, as other possible variations on the basic techniques. Light activation remains the primary function of the light switch, with non-lighting control being secondary to that.

Note: many believe that voice control will take over from the current "phone and the app" model as a key means of control for the smart home. However, there are times when voice can be intrusive, especially if a user wishes to activate a connected home video system to capture a real family moment—a spoken voice command to activate the camera can be a bit off putting and put the family on edge, whereas the techniques presented herein are less intrusive.

In addition to activation, the light system might send additional information for the video camera system—for example:

Brightness of the scene could be used to determine a duration the camera should record for;

Saturation of the scene may be used to determine a type of image processing to be applied, such as an image filter to be applied to the file (e.g. Instagram filter) e.g. high saturation may equate to the Kelvin filter whereas a low saturated scene may select inkwell a black and white filter;

Variation in colour could link with X-pro 11 that highlights certain areas of the film with more or less colour/exposure;

Etc. That is, one or more control parameters for a non-lighting control function associated with a user input component 5C may be derived from one or more lighting parameters of a lighting control function associated with that same user input component 5C—such as brightness, colour (e.g. saturation), and/or dynamic adjustment parameters (i.e. time-variation parameters, for a dynamic scene). For example, lighting parameters of an associated lighting scene.

Depending on the light scene's parameters these filters can be auto selected by the system. An override mechanism may also be rendered be available to the user 8.

Additional secondary control functions the user 8 may choose include:

Opening/closing of external sun blinds;

Playing music—the playlist or music activity might be linked to the type of light scene associated with the primary function of the particular button pressed;

Selecting an "away from home" soft security function, before leaving the home;

Putting the smart home into a desired state such as relax mode (whereby the phones are put on silent, the heating ramps up slightly, the washing machines/dishwashers pause etc., which can involve multiple smart home subsystems reacting to the same control event)

The lighting controller 40 receiving the light switch push event can be a dedicated lighting system controller, i.e. which, itself, only direct controls the luminaires 4; in order to control a non-lighting system, the non-lighting control component 46 of dedicated lighting controller can request a second controller of the non-lighting system to carry out the intended action at the non-lighting system, where in that case the non-lighting control function is performed by the lighting controller 40 by sending such a request to the controller of the non-lighting system.

However, the term "lighting controller" is not limited in this respect, and the lighting controller 40 can be a more generic smart home controller (e.g. a hub), which directly controls both the luminaires and at least one non-lighting system (without requiring a separate controller for that non-lighting system).

A control event received from the smart switch 5 can be an indication that a button has been pushed, which is then associated by e.g. the controller 40 to a lighting system action or a command which contains the lighting system action. Likewise, the passing on of the light switch push event can comprise the controller 40, which initially received said event, passing it on to a further controller or further system (which then associates the received event to an action, such as playing music from a playlist), or the controller 40 creating a command which directly controls the further system.

Extensions:

In various embodiments the lighting controller 40 can further support any of the following extensions, or any combination thereof.

Time Dependent Control:

To determine whether or not to pass a later control event to a non-lighting system, where the later control event would have no effect on the lighting state due to an earlier control event, the controller determines whether a time interval between the earlier and later control events meets a threshold criteria. For example, it may only be passed on if the time interval is above a threshold or, alternatively, only if it is below a threshold.

Following the above example, the second push only has the effect that the light switch push event is passed on to the smart music system if the second push is received within (say) 5 minutes from the first push of the switch; or alternatively only if the second push is received more than (say) 5 minutes from the first push.

Context Dependent Control:

Which system (if any) a light switch push event is passed on to can be dependent on e.g. time of day, day of week, weather conditions, or other context data. That is, the lighting controller may determine whether to pass on a control event based on context data, and optionally may select one of a plurality of different non-lighting systems to pass it onto based on the context data.

Multiple Layers:

The examples presented above can be extended where a third push of the same button 5C triggers a further action based on the fact that both the lights are already on and the music is already playing at the converted audio system 52, for example. More generally, where a (primary) lighting action associated with that button would have no effect in the lighting system 1, and a (primary) non-lighting action for the second system would have no effect in that system, the control event may for example:

trigger a different lighting action for the lighting system 1 associated with that button;

trigger a different non-lighting action for the second system (e.g. music system 52) associated with that button;

trigger both the different lighting action and the different non-lighting action;

be passed to a third system (e.g. image capture system 53 in FIG. 3), which is also a non-lighting system and of a different type than the second system, for example etc.

That is, a third connected system, such as the image capture system 53, can subscribe to the button press event as well as the second system, such as the audio system 52. The lighting controller 40 controls when the press event is propagated to the subscribed system(s), and which of those system(s) it is passed to. Moreover, with such approach more than one system can potentially be subscribed to the same event (such that one push triggers actions in two or more non-lighting systems). To avoid creating confusing for the user, it may be preferable for the user 8 himself to specify what system(s) are subscribed and how they react on receiving the event.

This applies equally to other types of non-lighting system that can be controlled by the lighting controller 40, for example any of those mentioned herein.

In this manner, the state of the lighting system 1 determines what function is activated—light control or non-light control (e.g. some smart home features other than illumination). The check that is performed whether or not the pushing of the switch changes the state of the lighting system can be strict (i.e. any change will cause the lighting system to execute the action associated with the event) or loose (i.e. if the pushing of the switch would cause only a minor, insignificant change in color, brightness, etc. then it is ignored and instead the event is passed on to the further controller or system).

That is to say, the lighting controller 40 determines whether or not a lighting action associated with a particular control event would cause a significant change in the lighting state, where in some implementations any change to the lighting state is considered significant, and in other implementation the lighting controller evaluates one or more significance criteria to determine whether a resulting change, if any, would be significant. Suitable significance criteria can be set in a variety of ways, based on how perceptually significant the change is expected to be for a user. For example, if performing the lighting action would only cause a change in the light emitted by the light(s) in question by an amount that is below a threshold, then the change may be classed as insignificant, where that amount can for example be a brightness value, color value or a vector of such values (e.g. a colour vector). Whether or not a given change is considered "significant" by any given system will be apparent in context.

In most cases, the pushing of the lighting switch will have only a single lighting action associated with it in the lighting system 1 (as opposed to a button which on first push switches lights on and on a second push switches them off).

However, a notable exception to this that, when combined with time dependent control, the second push received within (say) 5 minutes can have a non-lighting function (e.g. turn music on) whereas a second push after (say) 5 minutes has a different lighting function than the first push (e.g. first push is lights on and second push is lights off). Primarily, the decision of which type of control event to perform is still made on the illumination state, but can also take into account the time between pushes to allow multiple lighting functions to be associated with the same button.

If the event only gets passed on to a second system (and not to a third system), then for example a user might assign pause/play secondary function to a connected light switch that activates one or more lights in the living room; when the user uses the switch the system checks first if the light is already in the desired state, if not, the assigned light scene is activated, if yes than the secondary function is activated (pause/play audio system in the living room). A second push then starts playing audio (assuming it was off before) and a third push pauses the audio etc.

In other embodiments, the second, third or further push, when it would not change the output of the second third or further system, again controls the lighting system. For example: the first push turns on the lights (assuming they were off), the second push turns on the music (as the lights were already on and the music was off) and the third push is again handled by the lighting system (as the music was already on). Or, the third push could be handled by the lighting and music system: both are turned off.

In some embodiments, an ambient light level can be measured by the lighting system and impact the decision on how to respond to a particular control event. For example, a light scene usually activated by the button in question may not be activated when a light level sensor indicates that the room is fully illuminated with natural light. The system might then immediately activate the secondary function bypassing the primary function. To put it another way, the action associated with the light switch push event in the controller can be a conditional action; namely "turn on the lights when the ambient light level is low" in this example.

In this respect, it is noted that, whilst the term "illumination state associated with a lighting system" (or similar) can refer simply to the artificial illumination provided by the luminaires 4 themselves (that is, the lighting state mentioned above), it can also refer to the combined effect of the illumination from the luminaires with any ambient illumination in the same area, such as natural light. Accordingly, a determination made in dependence on the illumination state at a particular time takes into account light being emitted into an area by the luminaire(s) of the lighting system at that time (preferably inferred from the lighting state data 42), and optionally may also take into account lighting being emitted into that area by other illumination sources that are not part of the lighting system (e.g. as measured using one or more light sensing devices).

In order to summarize the various features described above, a method of handling control events in a lighting system will now be described with reference to FIG. 4, which is a flow chart for the method.

At step S2, the lighting controller 40 detects a control event, caused by actuation of a user input component 5C of the switch 5.

This user input component 5C can be associated with a single-action lighting control function, such as ON, OFF or the selection of a specified scene. A single-action control function means a control function such that repeated performance of that control function after it has been performed once has no effect for as only as the illumination state associated with the lighting system 1 remains unchanged (or does not exhibit significant changes, depending on the implementation). For example, this user input component can be one of a plurality of user input components of the switch 5, each of which is associated with a different lighting control function, e.g. single-action control function.

Alternatively this user input component 5C can be associated with a multi-action lighting control function, such as a function that toggles between ON and OFF (i.e. switches the lights on if they are off, and off if they are on), or cycles between two or more scenes (each sequential press changes scene). In this case in particular, the user input component may be the only user input component of the switch 5 (though it could also be one of a plurality). For example, the overall brightness of the illumination state (including ambient light) may be used to determine whether to perform the ON/OFF toggle, or to perform a non-lighting function instead.

At step S4, the lighting controller evaluates one or more illumination criteria relating to the illumination state associated with the lighting system, to determine whether to respond by performing the associated lighting control function. As noted, this can simply take into account the current lighting state of the luminaires 4 themselves, but optionally it can also take into account any ambient light contribution to the illumination state, such as natural light.

For example, in the main use cases described above, where the actuated user input component is associated with a single-action lighting control function, at step S4 the controller 40 would simply determine at step S4 whether performance of that function would have any (significant) effect on the lighting state of the lighting system 4. In that case, the illumination criteria are met if it would have no (significant) effect, as in that case no lighting action is needed (i.e. the primary lighting function is already fulfilled).

However, as noted, in other cases the illumination criteria could, say, only perform the lighting control function if the overall brightness in the environment 2 is below a threshold, which can include a contribution to the overall brightness from ambient light, measured using a light sensor(s), as well as the contribution from the luminaires 4. In that case, the illumination criteria are met if the overall brightness is above the threshold, as in that case no lighting action is needed (i.e. the environment is bright enough already).

At step S6, the lighting controller determines whether one or more timing criteria are met, based on a time interval between the control event detected at step S2 and an earlier control event which caused an earlier change in the illumination state associated with the lighting system 1. For example, a threshold criterion where that time interval needs to be either below or above a threshold for the associated lighting control function to be performed.

For example, where the associated lighting control function is a multi-action control function, such as an ON/OFF toggle, both the illumination state (e.g. current brightness) and the time interval may be used to decide whether to perform the ON/OFF toggle.

However, as noted step S6 is optional.

For example, for single-action control lighting functions, step S4 may be performed without step S6, as in the main use cases described above, i.e. only taking into account the illumination state with no timing constraints. However, it is also possible to apply both steps S4 and steps S6, for example to apply the secondary non-lighting control function only when the primary lighting control function would have no effect and the time limit meets the threshold criterion.

If any of the illumination or the timing criteria are not met, then the associated lighting control function is performed by the lighting control component 46 (S8) without causing any operational state change at a secondary operational system.

Alternatively, in the specific case that both steps S4 and S6 are performed, and the illumination criteria (meaning no lighting action is required) are met but the timing criteria are not (meaning no secondary non-lighting function should be performed), then no action may be needed at step S8.

Although shown as separate steps, S4 and S8 need not be separate operations in all cases. For example, to determine whether the lighting control function would have any effect, the controller 40 can attempt to perform it—if that attempt fails, it can infer that it is ineffectual, but if it succeeds, the function has now been performed and no further action is needed.

However, if all of the illumination or timing criteria are met (or both are met where both are evaluated), the method proceeds to optional step S10, at which the lighting controller 40 determines whether a secondary control function associated with the user input component 5C, for the secondary operational system, would have any effect at the secondary system. If not, the method proceeds at step S14: here there are a number of different options, depending on the implementation, for example:

1. the same and/or a different lighting control function may be performed;
2. the same and/or a different non-lighting control function for the second system may be performed;
3. both 2 and 3 may be performed;
4. a control function for a third non-lighting system may be performed; etc. Various examples of this are given above.

However, if performance of the non-lighting control function for the secondary system would have an effect, the non-lighting control function for the secondary non-lighting system is performed (S12) without causing any of the luminaires 4 to change the illumination state. That is, without controlling or accessing the luminaires 4.

As indicated, it is also possible for multiple non-lighting systems to respond to the non-lighting control function at step S12.

Where the lighting controller 40 controls the secondary system directly, it can make this determination using information that is available at the controller 40. If it does not, it can request that the secondary system perform the action, and determine that it would have no effect if the request is rejected by the second system (and if it is accepted, then no further action is needed because the function has now been performed).

Alternatively, steps S10 and S14 can be omitted, and the method can proceed straight to step S12 instead of step S10.

Figure 4:
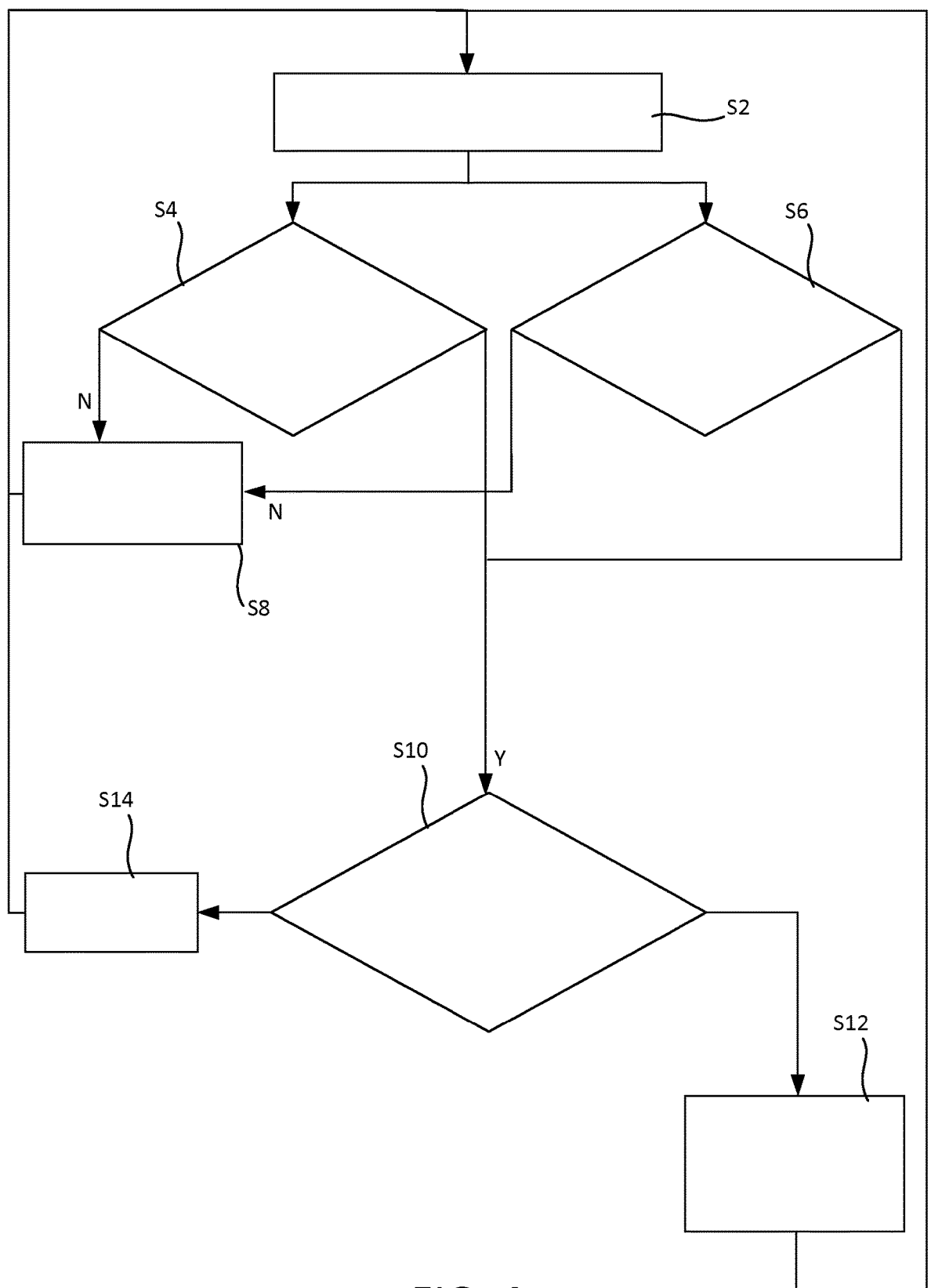
FIG. 4 shows a flow chart for a method of handling control events at the lighting controller.

The method of FIG. 4 is repeated each time a new control event occurs for the new control event.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of handling control events in a system of networked home devices, the method comprising, at a controller:
    receiving a signal indicative of a control event, the control event being an actuation of a user input device; and
    in response to the control event, determining whether to perform a control function associated with a networked home device of the system, that determination being made in dependence on a state of interaction between the networked home device and a physical environment in which it is located at a time of the control event;
wherein the controller makes said determination by determining whether performance of the control function would cause a significant change in the state of interaction; and
    if the performance of the control function would cause a significant change in the state of interaction, the control function is performed in response to the control event, it causes the networked home device to perform an action that changes the state of interaction between the networked home device and the physical environment in which it is located,
    if the performance of the control function would not cause a significant change in the state of interaction, the control function is not performed in response to the control event, the controller causes another control function associated with a different networked home device of the system to be performed in response to the control event instead,
    wherein if the controller determines not to perform the control function in response to the control event, it:
    determines whether performance of a third control function for a third networked home device of the system would cause any significant change in a state of interaction between the third networked home device and a physical environment in which it is located, or provides an indication of the control event to a different controller for making that determination at the different controller; and, if performance of the third control function would not have any significant effect, the other control function is performed for the different networked home device.

2. A method according to claim 1, wherein at least one of the networked home device and the different networked home device is a luminaire.

3. A method according to claim 2, wherein the networked home device is a luminaire and the control function is a lighting control function, the state of interaction between the luminaire and the physical environment being an illumination state associated with the luminaire.

4. A method according to claim 1, wherein the controller makes said determination in further dependence on a time interval between the control event and an earlier control event that caused the networked home device to change the state of interaction.

5. A method according to claim 4, wherein the controller makes said determination in dependence on the time interval by determining whether the time interval meets a threshold criterion.

6. A method according to claim 1, wherein the controller makes said determination in dependence on the state of interaction by determining whether the state of interaction meets a threshold criterion.

7. A method according to claim 1, wherein the control function and the different control function are associated with a user input component of the user input device; wherein an earlier control event is an earlier actuation of the user input component, and the controller responds to the earlier control event by performing the associated control function to change the state of interaction, wherein the control event is a later control event caused by actuation of the same user input component.

8. A method according to claim 1, wherein the controller responds to the later control event by performing the different control function associated with the user input component if the time interval between those events meets the threshold criterion and performance of the first control action would not cause any significant change in the state of interaction.

9. A method according to claim 1, wherein the controller provides the indication of the control event to the different controller, and if the different controller determines that performance of the third control function would not have any significant effect:
    the different controller provides an indication of that determination back to the controller, in response to which the controller causes the other control function to be performed,
    the different controller performs the other control function, or
    the different controller provides an indication of that determination to a third controller, in response to which the third controller causes the other control function to be performed.

10. A method according to claim 1, wherein the different networked home device is a device other than a luminaire, the different lighting control function being a non-lighting control function.

11. A method according to claim 1, wherein the user input device is a light switch.

12. A controller for a system of networked home devices, the controller comprising:
    an input configured to receive a signal indicative of a control event, the control event being an actuation of a user input device; and
    control logic configured to implement the steps of claim 1 in response to the control event.

13. A computer program product comprising code stored on a non-transitory computer readable storage medium and configured when executed on a controller to implement the method steps of claim 1.

* * * * *